(No Model.)

E. E. HARVEY.
GROUND STAKE.

No. 516,530. Patented Mar. 13, 1894.

WITNESSES:
H. B. Bradshaw
A. L. Phelps

INVENTOR
Elmer E. Harvey
BY Staley and Shepherd
ATTORNEYS

UNITED STATES PATENT OFFICE.

ELMER E. HARVEY, OF LONDON, OHIO.

GROUND-STAKE.

SPECIFICATION forming part of Letters Patent No. 516,530, dated March 13, 1894.

Application filed March 3, 1893. Serial No. 464,544. (No model.)

*To all whom it may concern:*

Be it known that I, ELMER E. HARVEY, a citizen of the United States, residing at London, in the county of Madison and State of Ohio, have invented a certain new and useful Improvement in Ground-Stakes, of which the following is a specification.

My invention relates to the improvement of ground stakes of that class which are ordinarily employed by surveyors and others in indicating the lines and corners of lots of ground.

The objects of my invention are to provide a sectional stake of such construction and arrangement of parts as to admit of the stake or projecting portion thereof being readily detached from the ground section thereof; to provide a durable and permanent ground section or socket piece for stakes; to construct the same in a neat, simple and reliable form and to produce other improvements which will be more specifically pointed out hereinafter. These objects I accomplish in the manner illustrated in the accompanying drawings, in which—

Figure 1:
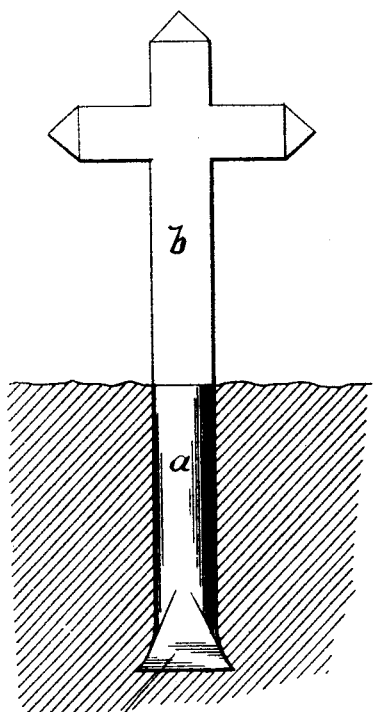
Figure 2:
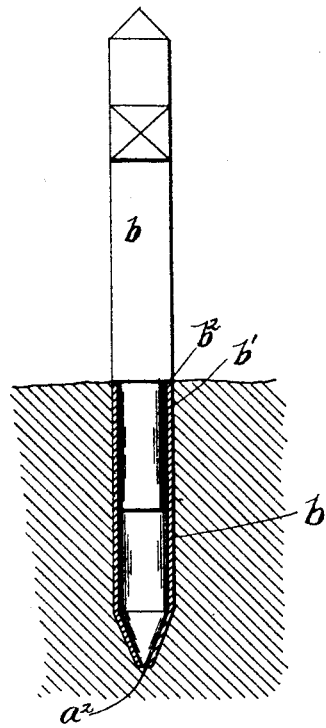
Figure 3:
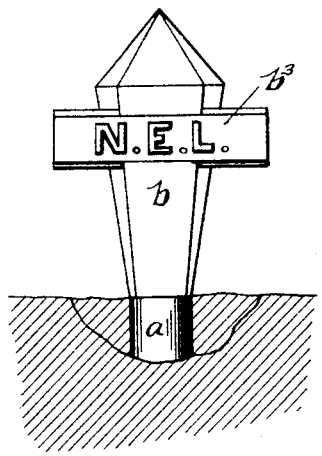
Figure 4:
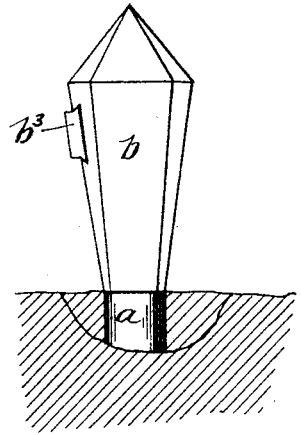

Figure 1 is a view in elevation of my improved stake, showing the ground within which the same is driven, broken away for the purpose of showing the socket or permanent section thereof. Fig. 2 is a view at right angles from that shown in Fig. 1, showing a sectional view of the permanent or socket section. Fig. 3 represents a modified form of stake showing in front elevation a name plate thereon and Fig. 4 is a view at right angles from that shown in Fig. 3.

Similar letters refer to similar parts throughout the several views.

In the construction of my improved stake, I employ two sections, $a$ and $b$. The section $a$ which we will designate as the socket section consists as shown in the drawings, of a tube of metal or other suitable material which has its lower end portion pointed or wedge shaped as indicated at $a'$. The lower ends or edges of the wedge shaped portion, are as shown, preferably so formed as to result in a narrow opening $a^2$ between the same. This ground or permanent section $a$, is designed as shown in the drawings, to be driven into the earth until its upper end is approximately flush with the ground. In the construction of the upper section $b$, I preferably provide the vertical stem thereof, with a reduced lower end portion $b'$ which is adapted to be inserted and fit snugly within the socket section $a$, while the shoulder $b^2$ formed by the production of the reduced portion $b'$, bears upon the upper end of the socket section. It is evident that the upper stake section $b$ may be of any suitable or desired form or outline and that the same may be produced of any desirable material. As shown in Figs. 3 and 4 of the drawings, I may provide one or more faces of the upper stake section $b$ with a transverse dove-tailed recess into which may be made to fit and slide a suitable name plate $b^3$, the latter being designed to have marked, carved or otherwise indicated thereon any desired letters or numbers. It is evident however, that such numbers, letters or other marks may be made upon the face of the upper section and that said recess may be omitted from the construction of the stake. From the construction herein shown and described, it will be seen that the lower section or socket piece, when produced of durable material may remain for many years embedded in the earth, whereas the ordinary wooden stakes usually employed for the purpose readily rot away or work loose.

It is obvious that a stake such as I have herein described, will be of great utility in all places where it is desired to keep the grass mown, inasmuch as the upper section may be readily removed and the lawn mower or other grass cutting device may be easily run over the socket section. It is evident that my improved stake may be produced at a reasonable cost of manufacture and that by its use the permanency of the stake is assured. Any water which may run into or collect within the socket $a$ will be allowed to pass off through the outlet $a^2$ in the bottom thereof, thus keeping the dampness away from the inserted end of the upper stake section.

It is obvious that in the construction of my improved stake the upper section might be so formed as to provide a socket for the reception of the upper end of the lower section thus reversing the manner of connection above described. This and other similar changes in details of construction may be produced in my invention without departing from the spirit thereof.

Having now fully described my invention, what I claim, and desire to secure by Letters Patent, is—

In a stake the combination of the embedded tubular section $a$, the walls of the lower portion thereof being convergently inclined and an opening between said inclined portions, of a suitable stake section $b$ adapted to be inserted within and supported from said embedded section, substantially as and for the purpose specified.

<div style="text-align:right">ELMER E. HARVEY.</div>

In presence of—
   D. C. BADGER,
   PATRICK DRISCOLL.